United States Patent [19]

Latady

[11] 4,149,783

[45] Apr. 17, 1979

[54] MINIATURE MAP VIEWER WITH ALIGNING RETICLE

[76] Inventor: William R. Latady, 220 Prospect St., Hingham, Mass. 02043

[21] Appl. No.: 836,677

[22] Filed: Sep. 26, 1977

Related U.S. Application Data

[63] Continuation-in-part of Ser. No. 577,983, May 16, 1975, abandoned, and Ser. No. 559,163, Mar. 17, 1975, abandoned.

[51] Int. Cl.² ............................................. G03B 21/00
[52] U.S. Cl. ...................................... 353/11; 350/241
[58] Field of Search .............................. 353/11, 12–14, 353/21, 22, 28, 40, 41; 33/1 SD; 40/86 R, 86 A, 106.1; 350/241, 238, 247, 239

[56] References Cited

U.S. PATENT DOCUMENTS

| 2,337,567 | 12/1943 | North et al. | 350/241 UX |
|---|---|---|---|
| 2,410,722 | 11/1946 | Eckert | 40/106.1 X |
| 2,503,550 | 4/1950 | Good | 350/241 X |
| 2,618,856 | 11/1952 | Swort | 33/1 SD |
| 3,094,781 | 6/1963 | Vanger | 33/1 SD |
| 3,248,793 | 5/1966 | Anderson | 33/274 X |
| 3,543,424 | 12/1970 | Klein | 350/241 X |
| 280,328 | 6/1883 | Putnam | 33/1 AA |
| 897,794 | 9/1908 | Smith | 33/272 |
| 997,166 | 7/1911 | Weber | 350/241 X |
| 3,583,808 | 6/1971 | Glass | 353/19 |
| 3,865,477 | 2/1975 | Gast | 353/11 |

FOREIGN PATENT DOCUMENTS

| 1077567 | 11/1954 | France | 353/12 |
|---|---|---|---|
| 42008 | 2/1917 | Sweden | 350/241 |

OTHER PUBLICATIONS

S. Romano, A Miniature Airborne Pictorial Plotter, Sep., 1955, pp 23–25; IRE Transactions on Aero, and Nav. Electronics.

Primary Examiner—Harry N. Haroian
Attorney, Agent, or Firm—John M. Brandt

[57] ABSTRACT

A miniature map viewer employing a magnifying lens and an aligning reticle disposed within the field of view of the lens is disclosed. The reticle is used for aligning points on the map and real geographic features and may be augmented by and used in conjunction with an angular orientation degree scale indicator, a compass, and/or an object sighting device, which are also disclosed.

13 Claims, 8 Drawing Figures

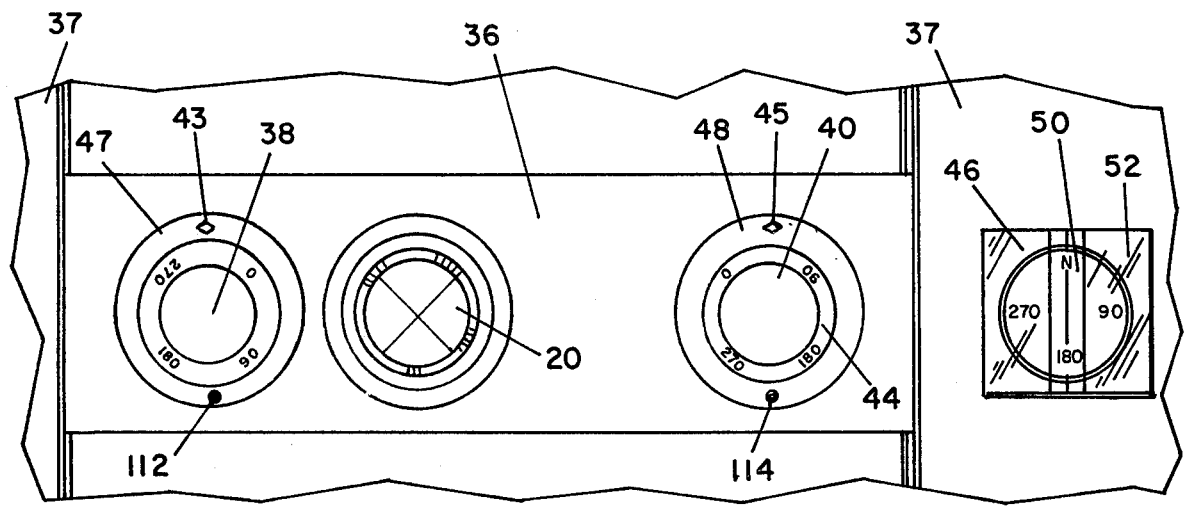
FIG. 3
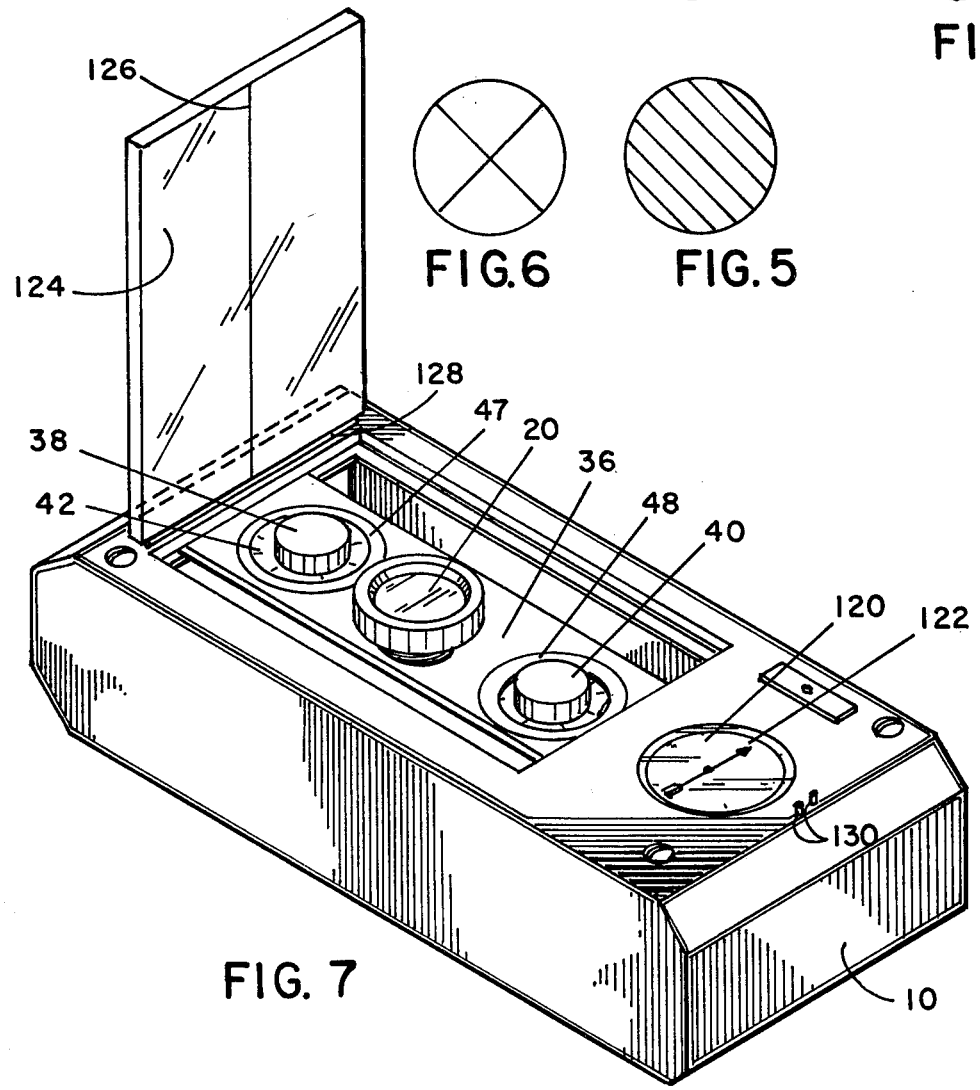
FIG. 6  FIG. 5
FIG. 7

MINIATURE MAP VIEWER WITH ALIGNING RETICLE

CROSS REFERENCE TO RELATED APPLICATION

This application is a continuation in part of Ser. No. 577,983 filed May 16, 1975, now abandoned and Ser. No. 559,163 filed Mar. 17, 1975 now abandoned by the same inventor.

BACKGROUND OF THE INVENTION

1. Field of the Invention

The invention pertains to miniature image viewers and more particularly to a miniature map viewer employing a reticle for aligning various reference points on a map as viewed through a magnifying lens.

2. Description of the Prior Art

This application presents an improvement in the concept of the miniature handheld viewer described in the above identified, previously filed applications. The purpose of that device was to provide a portable image viewer wherein a large quantity of information could be kept readily at hand on microfilm type transparencies. The viewer described was particularly useful for transporting and viewing miniature maps in the field by explorers, hikers, sailors, and the like. In using such maps, it is desirable to orient the map to the physical surroundings of the user for plotting a course of travel and for determining the user's position. To accomplish this a rotatable reticle is mounted within the field of view of the viewing lens such that it is viewed simulatneously with the map. No similar device exists in the prior art to the knowledge of the inventor.

SUMMARY OF THE INVENTION

The invention may be summarized as a miniature map viewer fitted with a magnifying viewing lens having an aligning reticle disposed within the field of view of the lens. Geographical features as actually seen may be aligned by the reticle with analagous features of the map to produce a map orientation, an indication of location, and/or a course or route of travel.

Increased accuracy and flexibility may be obtained by adding a degree scale indicator to the reticle, by mounting a compass on the housing, and, futher, by adding an object sight to be used in conjunction with the compass for determining the degree orientation or azimuth of geographical features. An additional independently rotating reticle may also be employed to provide a position location on the map at the juncture of the two reticles. The invention may be used in conjunction with the lens scanning concept described in the previously filed application identified above.

These and other features and objects of the invention will become more clear from the description of the preferred embodiment and drawings which follow.

DESCRIPTION OF THE DRAWINGS

FIG. 3 is a partial front view of the apparatus of FIG. 1;

FIG. 5 is a front view of one form of reticle appropriate for use in the invention;

FIG. 6 is a front view of another form of reticle appropriate for use in the invention;

FIG. 7 is a perspective view of an alternative embodiment of the invention; and

DESCRIPTION OF THE PREFERRED EMBODIMENT

Figures 1, 2, 4:
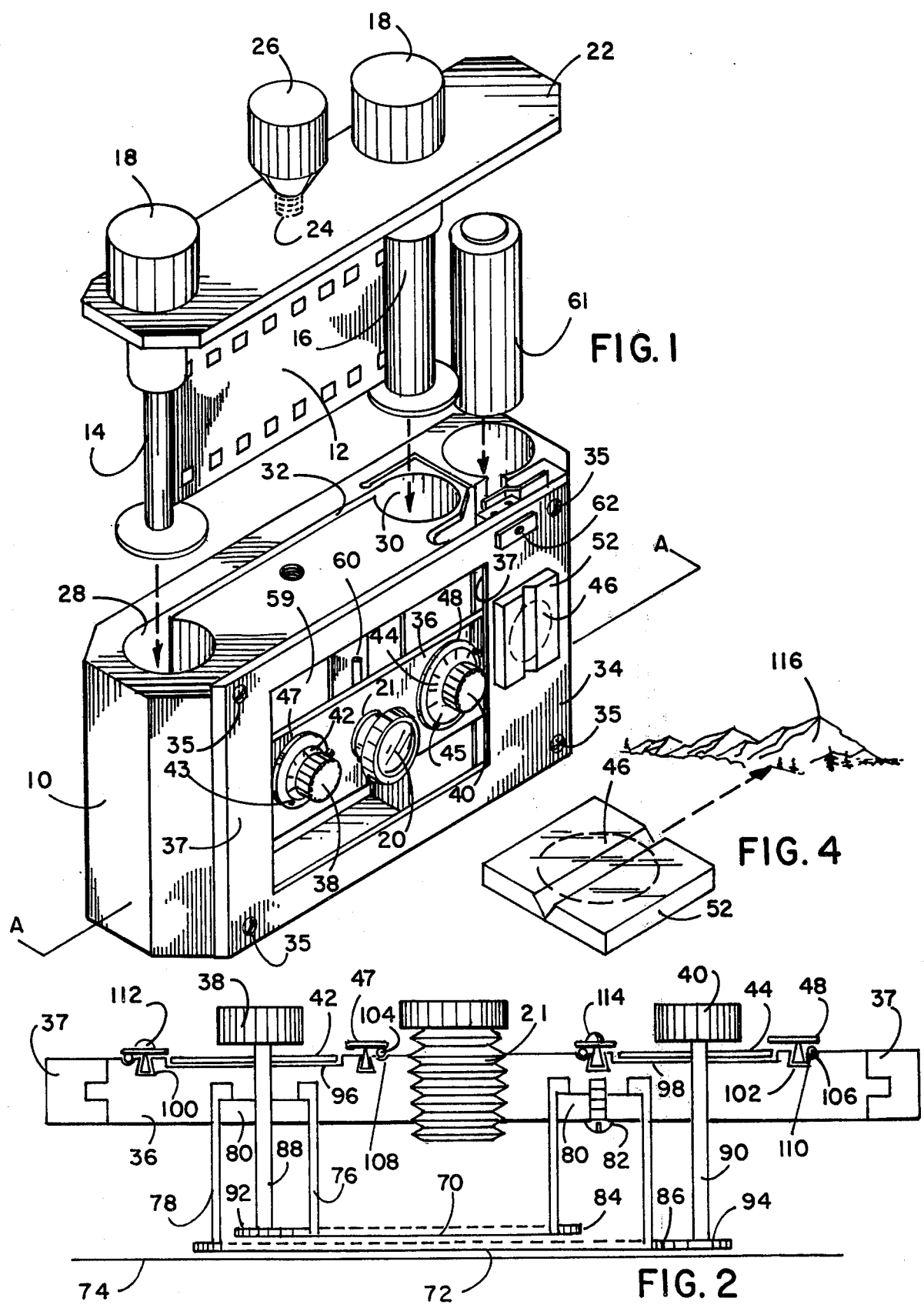
FIG. 1 is an exploded perspective view of a miniature map viewer incorporating the preferred embodiment of the invention.
FIG. 2 is a detailed cross-sectional view of the preferred embodiment taken along lines A—A of FIG. 1.
FIG. 4 is a perspective view of use of a structure illustrated in FIG. 3.

Referring first to FIG. 1, there is shown in exploded perspective view, a viewer incorporating an aligning reticle system and mounting mechanism which constitute the preferred embodiment of the invention. Housing 10 is arranged to hold all of the components of the viewer, and while manufacturable in any convenient size, the device is contemplated as a pocket system. A strip of miniature map images 12, shown as a photographic transparency roll, is mounted on rollers 14 and 16 by insertion into longitudinal slots, not shown, in the rollers.

Knurled knobs 18 are used to rotate the rollers to expose various portions of the map in the longitudinal direction to the field of view of the lens 20. Other transport apparatus may be used or individual sheet images may be alternately inserted and removed by the user.

Rollers 14 and 16 are supported by and rotate through top plate 22 which plate forms a cover for the housing. Metal screw 24 attached to knob 26 is used to secure the top plate to the housing, the rollers fitting into tubular orifices 28 and 30 and the map transparency into slot 32 in the housing body.

A separate face plate 34 forming the front of the housing is attached by screws 35. Sliding plate 36 slides up and down in tracks 37 attached to face plate 34 and carries viewing lens 20, contained in holder 21 which holder is screw-mounted for focusing on plate 36. The rotatable reticle system is also mounted on plate 36. Movement of the plate allows the lens to scan over the map image.

Two reticle rotating knobs 38 and 40 are shown with attached degree scale indicators 42 and 44. Reference marks 43 and 45 are scribed on rotatable rings 47 and 48. The structure, operation and function of the reticles are more fully shown and described in FIGS. 2-5 below.

Compass 46 is inserted in plate 34 and has a free-floating, magnetic, degree-indicating dial 50. A transparent V-shaped objects sight 52 fits over the compass providing a protective cover.

Two alternative lighting systems for illuminating the image are employed in the viewer. The first, for viewing in daylinght, used a transparent or transluscent screen 59 in the back of the housing. The screen is oriented toward any source of bright daylinght or optionally a source of artificial light which shines through the screen thereby illuminating the image. Additionally, an internal artificial light 60 may be included powered by battery 61 and activated by micro switch 62. The fine wire connections between switch, light, and battery are not shown but are those which could be obvious. When using such an internal light, screen 59 is scratch or ruled along its length perpendicular to the light beam to scatter the light outward through the transparency or alternately a light wedge screen may be used to accomplish the same result.

Referring next to FIG. 2 there is shown a cross-sectional view of the lens and reticle system discussed above. Like numbers refer to like parts in all Figures. Reticles 70 and 72, fine stretched wires for example, are mounted in the field of view of the lens very close to the map image plate 74. Alternately, the reticles may be ruled lines on clear glass or plastic supports. The reticles are supported by cylinders 76 and 78 which are rotatably mounted on plate 36 by ring 80 held in place by a series of screws 82, one of which is illustrated. Cylinder rotation gears 84 and 86 are attached to the bottom portions of the respective cylinders. The rotation gears and thus the cylinders are rotatably driven by knobs 38 and 40 which operate through shafts 88 and 90 attached to drive gears 92 and 94.

Degree scale indicators 42 and 44 are similarly attached to and rotated with shafts 88 and 90. The indicators are marked from 0 to 360 degrees in convenient intervals and are positioned such that the 0–180 degree axis of each is aligned with the respective reticle as shown in FIG. 3. The indicators may be indented into wells 96 and 98 in plate 36 if desired. Rotatable rings 47 and 48 surround indicators 42 and 44 respectively and are mounted by snapping into dovetail shaped grooves 100 and 102 in plate 36. Ball bearings 104 and 106 fitted in wells 108 and 110 provide retaining pressure for setting and retaining the rings and their reference marks in an appropriate position. Raised domes 112 and 114 provide means for moving the rings. This portion of the viewer in particular may be manufactured largely of plastics to provide low friction bearing suraces. Other portions may also be manufactured in synthetics for economy.

FIG. 4 illustrates the use of the optional compass sight to align and determine the azimuth of a distant object such as a mountain 116.

FIG. 5 shows a reticle comprised of a plurality of parallel lines for use in a viewer in which the lens is not moveable with respect to the map image, i.e. in which the field of view of the lens encompasses the entire map image. Any one of the parallel lines may be used to align a selected geographical feature on the map.

FIG. 6 illustrates a reticle composed of two crossed lines carried on the same support useful for identifying points on the map image when several users or viewers wish to discuss map characteristics while successively viewing the image.

FIG. 7 shows an alternative apparatus for performing compass sightings on geographical features. Compass 120 with rotating dial 122 is mounted similarly to that described above. A clear cover 124 with a longitudinaly ruled sighting line 126 is attached by hinge 128 and is arranged to fit over the lens and reticle dial apparatus to protect the viewer when not in use. Two short upright posts 130 are positioned at the opposite end of the viewer in alignment with line 126. Sightings are obtained by aligning the geographical object, line 126, and the space between posts 130. The compass reading falling on this line is then observed and noted for use as will be desribed below.

Figure 8:
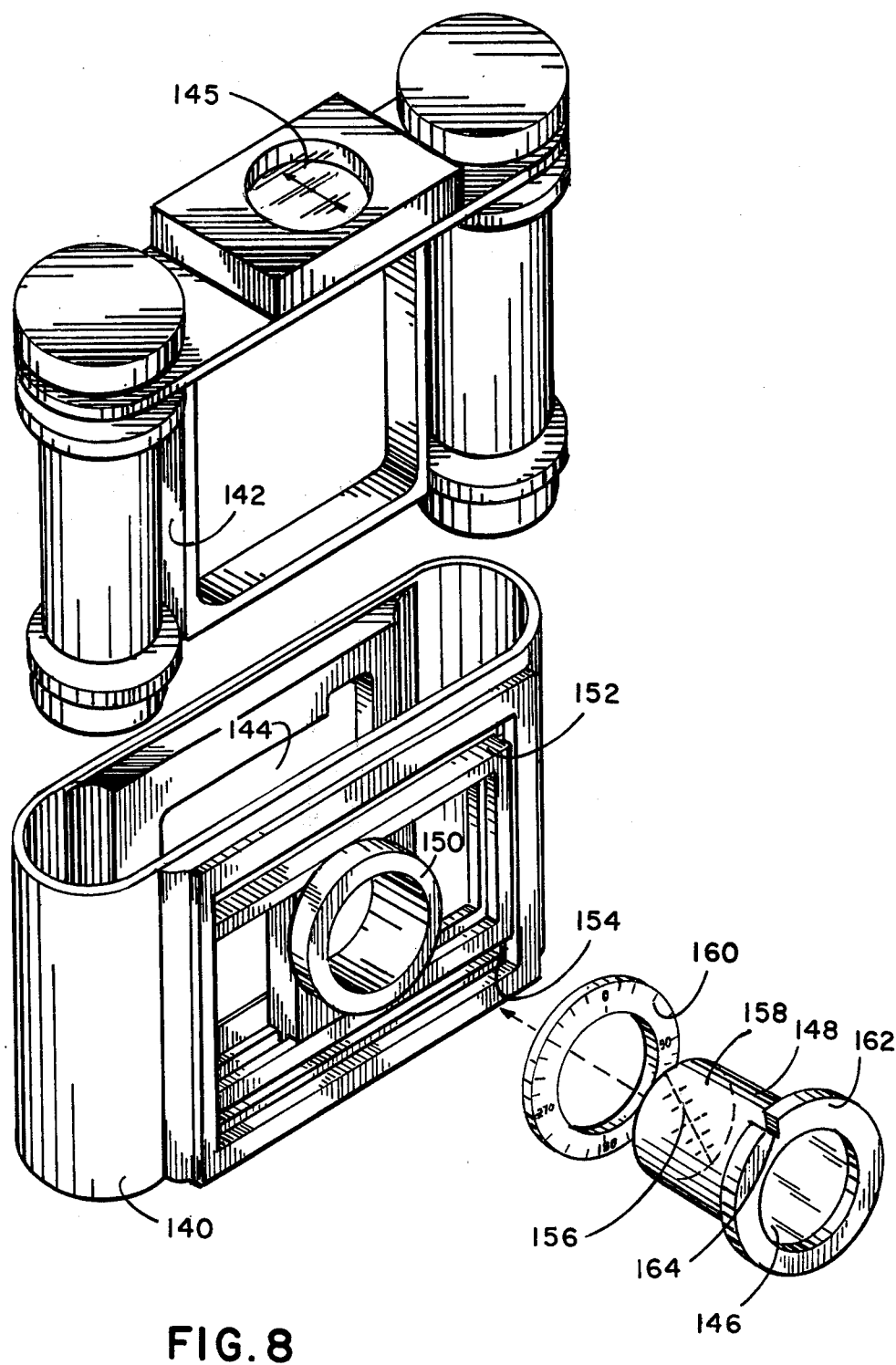
FIG. 8 is a perspective view of an additional alternative embodiment of the invention.

FIG. 8 is a perspective view of an additional alternative embodiment of the invention. The reticle-map compass orientation feature is designed to function exactly opposite of the above embodiments. In those, the circular degree scale and reticle are operably arranged to rotate in conjunction and the reference ring is independantly set to a desired position. In this embodiment the reticle and reference ring rotate together, the reference mark being placed in alignment with the reticle, and the circular degree scale rotates independently.

The viewer is comprised of a housing 140, a dual rotatable roller assembly 142 for mounting a roll of map images, a transluscent or transparent illuminating screen 144 and a compass 145. Further included is a magnifying lens 146 in a lens holder 148 which rotatably fits into mounting a plate 150 slidably mounted on track assembly 152. The track assembly is in turn slidably mounted on tracks 154 attached to the housing, the combination of which provides a means for scanning the lens across the image.

A reticle 156 is inscribed on transparent plate 158 mounted at the bottom of holder 148. A circular degree scale 160 is arranged to tightly fit over the holder and is contained between plate 150 and reference ring 162 when the holder is in place. Reference ring 162, which also serves as a means to rotate the lens holder has reference or witness mark 164 inscribed or cut into its circumference. The mark is vertically aligned with the reticle for indicating reticle position with respect to the degree scale.

OPERATION OF THE INVENTION

The principal purpose of the invention is to utilize the reticle system to align points of the map with themselves and with real geographic features visible to the viewer. The addition of each piece of apparatus to the basic reticle increases the accuracy and flexibility of the device.

In its simplest form, a single reticle may be used to orient the map and the real world if one or more geographic features can be correlated with points on the map. This is accomplished by rotating the viewer and the reticle such that a geographic feature, the reticle, and the analagous point of the map are all aligned. The viewer's position then lies somewhere along the reticle if the three are aligned properly. Since alignment can be had in any of four directions, the proper direction must be discerned from other information, for example the position of other features or the user's knowledge of the proper direction from the position of the sun.

If a compass direction is indicated on the map this will assist. If a compass is at hand, it may be used to orient the viewer in conjunction with the compass indication of the map.

Addition of the reticle degree scale indicator will refine the process further by allowing the reticle to be set to a particular angular orientation reading as would be provided by a separate compass or the optional accessory compass and sight mounted on the viewer housing as described above.

The map orientation within the viewer may vary from map to map, or it can be selected by the manufacturer to always be the same, north toward the top, for example. To set the map orientation in proper juxtaposition with the reticle degree scale, the rotatable rings and reference marks discussed above are used. The reticle is merely set to a north-south, 0–180 degree alignment on the map and the reference mark rotated to the zero position of the degree scale indicator. The map and the external indicators of the viewer then correspond such that degree setting, as determined by sighting from the compass, may be dialed onto the reticle scale and viewer on the map. A permanent mark scribed on the housing can be used when the orientation of each map is always the same.

Alternatively, in devices where the circular degree scale is independently rotatable as is illustrated in FIG. 8, the reticle is also set to the north-south alignment of the map and the circular degree then oriented to the map by proper juxtaposition with the witness mark on the reference ring.

Two separate reticles allow all of the above operations and additionally the ability to locate position by reading the cross point of two reference alignments. As illustrated in FIG. 3, for example, the map, not shown, has an orientation of north toward the top of viewer. This orientation is marked on the map itself. The map and viewer are oriented toward the real world as shown by the compass, the viewer being held face up. Two features have been previosuly sighted, one at 45° east of north, other other at 45° west of north. These sightings have been set into each respective reticle so that the cross point is the viewer's location. Of course the map must be properly positioned with respect to the reticles, and this is accomplished by scanning the lens by sliding the mounting plate up and down and by moveing the map back and forth using the roller transport system described above. If the lens and map are fixed reticles consisting of a plurality of parallel lines, as shown in FIG. 5, may be used, the viewer selecting the proper line or lines according to the map features utilized.

It is expected that variations in the above described apparatus and its uses will become obvious to those skilled in the art from the foregoing disclosure. The invention is accoridngly defined by the following claims.

What is claimed is:

1. A miniature map viewer employing a magnifying lens adapted for viewing a map image having information of a size not normally discernable to the human eye, said map image having a compass orientation thereon, said viewer comprising:
   a. a housing;
   b. means for mounting said map image within said housing;
   c. means for illuminating said map image;
   d. a reticle rotatable mounted within said housing in close proximity to said image;
   e. a magnifying lens mounted within said housing arranged for simultaneous viewing of said image and said reticle;
   f. lens scanning means arranged to move said lens and said reticle in a plane to scan the surface of said image; and
   g. reticle indicator means for determining the angular orientation of said reticle with respect to said compass orientation of said map image, said reticle indicator means comprising:
      1. a circular degree scale rotatably mounted on said viewer; and
      2. reference ring means having a reference mark inscribed thereon rotatably mounted on said viewer, said ring means arranged concentrically with said circular degree scale.

2. The apparatus of claim 1 wherein said reference ring means is mounted on said housing and said circular degree scale is mounted on said housing in operable conjunction with said reticle.

3. The apparatus of claim 1 wherein said circular degree scale is mounted on said housing and said reference ring means is mounted on said housing in operable conjunction with said reticle.

4. The apparatus of claim 1 wherein said reticle comprises a single line disposed across the center of the field of view of said lens.

5. The appratus of claim 1 wherein said reticle comprises a plurality of spaced apart parallel lines.

6. The apparatus of claim 1 wherein said reticle comprises a pair of crossed lines.

7. The apparatus of claim 1 further inclduing:
   a. a second reticle rotatably mounted within said housing in close proximity to said image arranged to be viewed by said magnifying lens simultaneously with said map image; and
   b. second reticle indicator means for determining the angular orientation of said second reticle with respect to said compass orientation of said map image, said second reticle indicator means comprising;
      1. a second circular degree scale rotatable mounted on said viewer;
      2. second reference ring means having a reference mark inscribed thereon rotatably mounted on said viewer, said ring means arranged concentrically with said circular degree scale.

8. The apparatus of claim 1 further including means for transporting said map image in a plane within said housing across the field of view of said magnifying lens.

9. The apparatus of claim 1 further including compass means mounted within said housing.

10. The apparatus of claim 9 further including compass indicator means for determining the angular orientation of said compass.

11. The apparatus of claim 10 wherein said compass indicator means comprises a circular degree scale affixed to the rotating portion of said compass.

12. The apparatus of claim 11 further including object sighting means mounted on said housing adjacent said compass indicator means, said sighting means for aligning said compass indicator means and an object for determining the azimuth of said object.

13. A miniature map viewer employing a magnifying lens adapted for viewing a map image having information of a size not normally discernable to the human eye, said map image having a compass orientation indicated thereon, said viewer comprising.
   a. a housing;
   b. means for mounting said map image within said housing;
   c. means for illuminating said map image;
   d. a cylindrical magnifying lens holder rotatably mounted within said housing;
   e. a reticle mounted on said lens holder in close proximity to said image;
   f. reticle indicator means for determining the angular orientation of said reticle with respect to said compass orientation of said map image said reticle indicator means comprising:
      1. a reference mark inscribed on said lens holder in juxtaposition and alignment with said reticle;
      2. a circular degree scale rotatably mounted on said lens holder;
   g. a magnifying lens mounted within said lens holder arranged for simultaneous viewing of said image and said reticle; and
   h. lens scanning means arranged to move said lens and said reticle in a plane to scan the surface of said image, said scanning means further arranged to receive said lens holder.

* * * * *